United States Patent [19]

Jardin

[11] Patent Number: 4,537,442
[45] Date of Patent: Aug. 27, 1985

[54] SLIDING AND TILTING ROOF FOR MOTOR VEHICLES

[75] Inventor: Hans Jardin, Inning, Fed. Rep. of Germany

[73] Assignee: Webasto-Werk W. Baier GmbH & Co., Fed. Rep. of Germany

[21] Appl. No.: 483,176

[22] Filed: Apr. 8, 1983

[30] Foreign Application Priority Data

May 14, 1982 [DE] Fed. Rep. of Germany ....... 3218209

[51] Int. Cl.³ .............................................. B60J 7/04
[52] U.S. Cl. .................................... 296/221; 296/213
[58] Field of Search ................. 296/216, 213, 220–223

[56] References Cited

U.S. PATENT DOCUMENTS

| | | | |
|---|---|---|---|
| 4,085,965 | 4/1978 | Schlapp | 296/213 |
| 4,403,805 | 9/1983 | Strem, Jr. et al. | 296/221 |
| 4,417,763 | 11/1983 | Schlapp et al. | 296/221 |

FOREIGN PATENT DOCUMENTS

1204099 9/1970 United Kingdom.

Primary Examiner—Robert B. Reeves
Assistant Examiner—Dennis H. Pedder
Attorney, Agent, or Firm—Sixbey, Friedman & Leedom

[57] ABSTRACT

A vehicle roof of the type having a cover that closes a roof open and is slidably and tiltably displaceable out of a position closing the roof opening is constructed to avoid the problem of making the outside contour of the cover match the outside contour of the fixed roof part, particularly, with respect to contours that convexly curve in a direction transverse to the cover displacement direction. In accordance with a preferred embodiment, this problem is solved by adjusting the transverse contour of the cover, when the cover is in its closed position, through a balancing of upward and downward forces effected by a rain gutter and respective pivot mechanisms for the cover and gutter.

26 Claims, 11 Drawing Figures

SLIDING AND TILTING ROOF FOR MOTOR VEHICLES

BACKGROUND AND SUMMARY OF THE INVENTION

The invention relates to a sliding and tilting roof for motor vehicles, with a rigid cover which closes a roof opening in its closed position and which is displaceably guided in the vicinity of its leading edge at both lengthwise sides of the roof opening by one guide element in each of two lengthwise guides, is mounted to pivot about a pivot axis determined by the guide elements and running transversely to the cover displacement direction, is linked in an area displaced rearward from the leading edge of the cover by a first pivot mechanism with a transport bridge adjustable in the cover displacement direction, and is pivotable by displacement of the transport bridge, optionally with elevation of its trailing edge above the fixed roof area, or is displaceable beneath the rear fixed roof area after its trailing edge is lowered, as well as with a gutter disposed beneath the trailing edge of the cover, movable within limits relative to the transport bridge in the cover displacement direction, said gutter being displaceable together with the cover beneath the fixed rear roof area.

In a known sliding and tilting roof of this type (German AS No. 2245084, corresponding to U.S. Pat. No. 3,894,767), the gutter is displaceably guided in the tracks running parallel to the lengthwise guides for the cover at a fixed, predetermined distance beneath the rear fixed roof area. It is entrained as the cover is displaced in such fashion that the downwardly tilted trailing edge of the cover fits into corresponding depressions in the bottom of the gutter. When the cover is in the closed position, there is no contact between the gutter and the cover or the fixed roof area.

In another known sliding and tilting roof (German Pat. No. 19 20 481), a transport bridge, which serves simultaneously as a gutter, is provided in the vicinity of the trailing end of the cover, said bridge being raisable and lowerable and so connected with the cover that, when the transport bridge is raised, the cover is lifted into the closed position and, in the lowered condition, with the transport bridge moving horizontally, the cover is moved along with the latter. The pivot mechanism for the cover abuts the transport bridge in order to exert pressure upward when the trailing edge of the cover is raised.

Tolerances are unavoidable in motor vehicle roofs. In particular, there is a practical problem of making the outside contour of the cover match the outside contour of the fixed roof part. This match is particularly sensitive transversely to the cover displacement direction because the cover and the fixed roof area are usually convex in this direction. If the cover, in known roofs, moves from the tilted position to the closed position, the result is frequently an unsatisfactory match between the contours. To offset this, motor vehicle manufacturers must frequently carry out laborious finishing and adjustment work.

Thus, it is a principal object of the present invention to design a sliding and tilting roof of the type described hereinabove, in such a manner that a contour match is achieved in the especially critical area of the trailing edge of the cover and the adjacent trailing edge of the roof opening, in a simple and reliable fashion.

This object is achieved, according to preferred embodiments of the invention, by virtue of the fact that the gutter is connected with the transport bridge by a second pivot mechanism which, when the cover is in the closed position, presses the gutter against the force of the first pivot mechanism upward against the underside of the cover. In the closed position, the forces exerted by the first pivot mechanism act on the cover, attempting to pull the trailing edge of the cover downward, while forces are simultaneously exerted by the second pivot mechanism via the gutter and attempt to push the cover upward in the vicinity of its trailing end. This subjection to two forces can lead to the area of the trailing end of the cover being given a shape which can be determined exactly in advance, when it is in the closed position.

The contour match can be further improved in accordance with another embodiment of the invention by virtue of the fact that the gutter is also pressed against the underside of the fixed rear roof area when the cover is in the closed position.

An especially simple structural solution is obtained where the gutter is articulated to the guides of the cover by lateral pivot arms and is pivotable about the same pivot axis as the cover. According to a modified embodiment of the invention, the gutter can also be articulated by lateral pivot arms to the cover at a point which is displaced rearward and preferably also upward relative to the pivot axis of the cover. This produces an especially flat roof design. The second pivot mechanism can advantageously have slotted guides disposed on either side of the cover, each of which cooperates with a guide pin connected to the transport bridge. The slotted guides can simply be mounted on the pivot arms or can be parts of these pivot arms. According to a kinematic reversal, the second pivot mechanism can have ramps fastened on either side of the transport bridge and guides cooperating therewith mounted on the gutter or its lateral pivot arms.

Preferably, the gutter has a gasket extending essentially transversely to the cover displacement direction, said gasket abutting the underside of the cover when the latter is in the closed position. The second pivot mechanism presses this gasket against the cover over the full width of the cover, whereby penetration of water into the interior of the vehicle is reliably prevented. Such a gasket can, advantageously, abut a point on the underside of the cover which is located at a distance forward of the trailing edge of the cover, when the cover is in the closed position.

For a further improvement of the seal in the rear area of the cover, the gutter can have a gasket that essentially extends transversally to the displacement direction of the cover, said gasket pressing from below against the underside of the rear fixed roof area, at least when the cover is closed, in the vicinity of the trailing edge of the roof opening. The latter gasket can have a segment which enters a gap between the trailing edge of the cover and the trailing edge of the roof opening, when the cover is in the closed position. This gasket can also advantageously be provided with a shoulder, which abuts the trailing edge of the cover from the rear, at least when the cover is in the closed position.

In another embodiment of the invention for a sliding and tilting roof in which the cover and the portion of the rear fixed roof area which abuts the cover from the rear when the cover is in the closed position are curved convexly outward, in a vertical plane which is perpendicular to the cover displacement direction, the gutter is simultaneously convexly curved in a plane such that the curvature of the cover, in the vicinity of its trailing edge, is less than the convexity of the gutter, and the convexity of the rear fixed roof area, in the vicinity of the trailing edge of the roof opening, in turn, is less than the convexity of the trailing edge of the cover. This favors the desirable match of the convexities of the cover and the fixed roof area when the cover is closed. Preferably, the stiffness of the gutter in the plane perpendicular to the cover displacement direction is greater than that of the cover, while the stiffness of the cover, in turn, is greater than that of the rear fixed roof area.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

The sliding and tilting roofs described in greater detail hereinbelow are arranged symmetrically relative to a center line (10 in FIG. 1), so that a description of the roof parts shown on the right-hand side will suffice.

Figure 1:
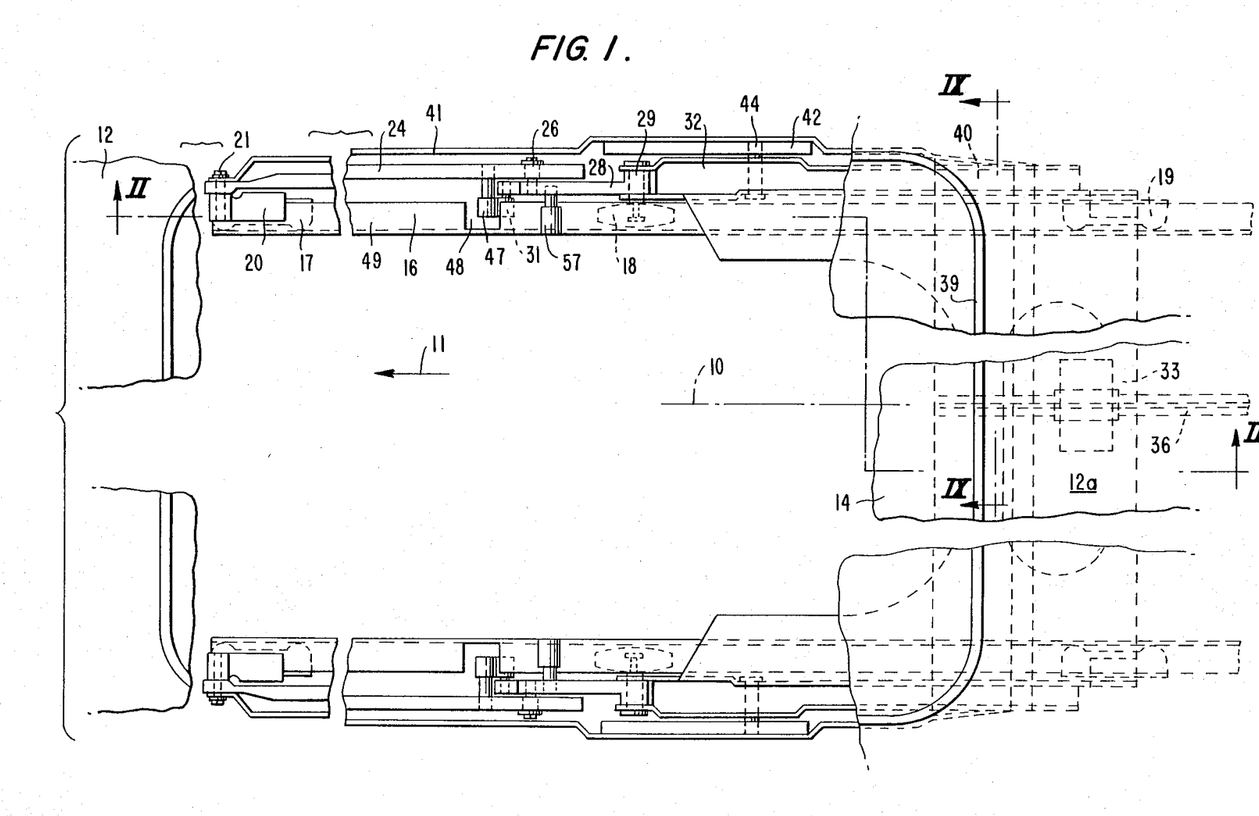
FIG. 1 is a cutaway top view of a portion of a sliding and tilting roof.
Figure 2:
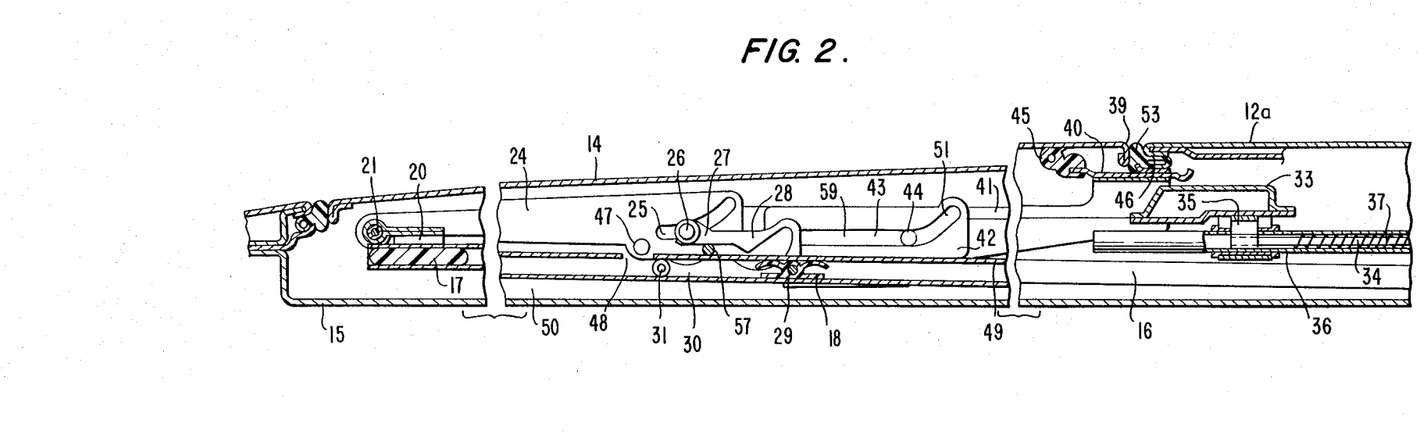
FIG. 2 is a section along line II—II in FIG. 1, whereby the cover, as in FIG. 1, is in the closed position.

The direction of forward movement of the vehicle is indicated in FIG. 1 by arrow 11. The fixed roof area, designated 12 as a whole, comprises a roof opening 13, which can be closed by a rigid cover 14 (FIG. 2). Roof opening 13 is surrounded at the front and sides by a roof frame 15, which extends rearward beneath the rear fixed roof area 12a. Roof frame 15, as usual, forms a gutter in the forward and lateral areas of the roof opening 13. A guide rail 16 is provided as a lengthwise guide. Shoes 17, 18 and 19 run in rail 16. Forward shoe 17 is mounted on a shoe carrier 20 which extends over rail 16 and bears a pivot pin 21, which forms a pivot axis running transversally to the cover displacement direction, together with a corresponding pivot pin on the left sde of the roof. A first slotted guide 24 is mounted on cover 14, the forward end of said guide being rotatably mounted on pivot pin 21. The first slotted guide 24, pointing rearward from pivot pin 21, is provided with a guide slot 25 in which a guide pin 26 laterally engages. Guide pin 26, directed essentially horizontally and transversally to the cover displacement direction, rests on the free end of a projection 27 of an adjusting lever 28. Lever 28 is rotatably mounted on a pivot pin 29 connected with shoe 18. A second projection 30 of adjusting lever 28 bears a guide roller 31 at its free end. Pivot pin 29 links a forwardly directed arm 32 to a transport bridge 33 running transversally to the cover displacement direction. Rear shoe 19 is supported on transport bridge 33. The free end of an incompressible threaded cable 34 is fastened in the middle area of transport bridge 33 by means of a dog 35. Threaded cable 34 is displaceably guided in a fixed tube 36. On its upper side, tube 36 comprises a lengthwise slot 37 through which dog 35 passes. Threaded cable 34 is connected in conventional fashion with a drive, not shown, which can be either a manual drive or a motor drive.

A gutter 40 is disposed beneath cover trailing edge 39. Gutter 40 is connected by a lateral pivot arm 41 with pivot pin 21. A second slotted guide 42 with a guide slot 43 is mounted on pivot arm 41. A guide pin 44, directed essentially horizontally and transversally to the cover displacement direction, engages guide slot 43, said pin being fastened to arm 32 of transport bridge 33. Gutter 40 is provided with two gaskets 45 and 46, both of which extend essentially transversally to the cover displacement direction.

Figure 3:
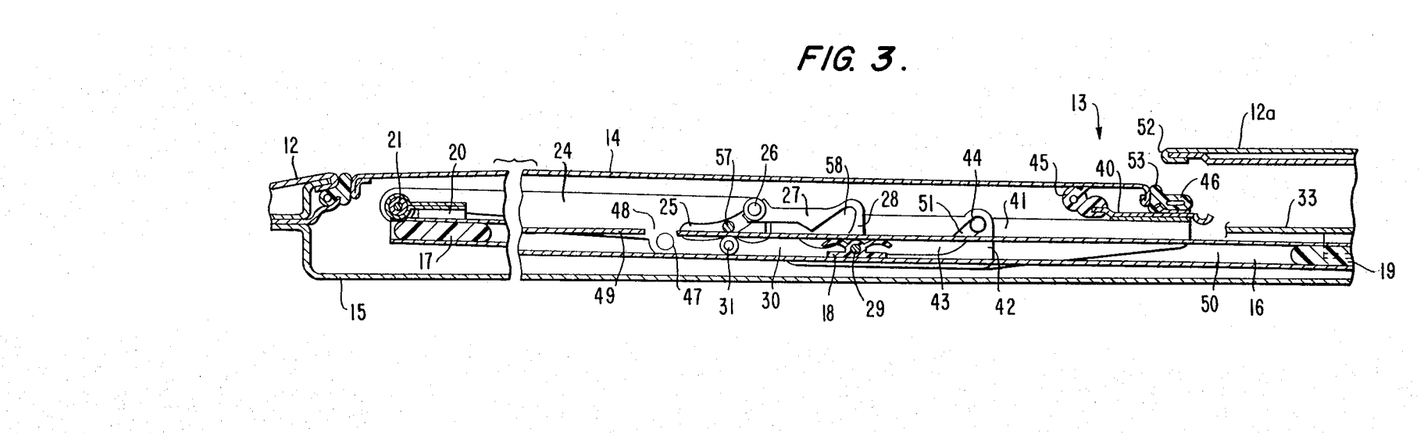
FIG. 3 is a section in the vicinity of the right guide track, with the cover lowered at its trailing edge.

When transport bridge 33 is pulled rearward by means of threaded cable 34, starting from the closed position of cover 14 shown in FIG. 2, guide pin 26 moves rearward in guide slot 25 of slotted guide 24. Guide 24 and cover 14, permanently attached thereto, are pivoted clockwise about pivot pin 21 in FIG. 2. A sliding pin 47, projecting laterally from slotted guide 24, passes through a cutout 48 in the upper flange 49 of guide rail 16 into the guide channel 50, formed by guide rail 16 (FIG. 3), to hold cover 14 in the lowered position, in which cover 14 has its trailing edge 39 lowered beneath the rear fixed roof area 12a. Simultaneously, guide pin 44 moves rearward in guide slot 43, whereby slotted guide 42 and, with it, pivot arm 41 and gutter 40 are pivoted downward by means of the rising branch 51 of guide slot 43. As transport bridge 33 is retracted further, cover 14 and gutter 40 are pulled rearward beneath rear fixed roof area 12a as a result of guide pin 26 striking the rear end of guide slot 25 and guide pin 44 striking the rear end of the guide slot 43.

When transport bridge 33 moves forward, cover 14 is brought into the closed position, as shown in FIG. 2, in the reverse sequence, via slotted guide 24 and guide slot 25, while gutter 40, with its gaskets 45 and 46, is pivoted upward by slotted guide 42 and guide pin 44. Gasket 45 is then pressed against the underside of cover 14 at a point located in front of trailing edge 39 of the cover, while gasket 46 is pressed against the underside of rear fixed roof area 12a in the vicinity of trailing edge 52 of roof opening 13. Gasket 46 comprises an upwardly projecting segment 53 which engages a gap between trailing edge 39 of the cover and trailing edge 52 of roof opening 13 when cover 14 is in the closed position. A shoulder 55 on gasket 46 comes to rest against a downwardly bent edge 56 on cover trailing edge 39.

Figure 4:
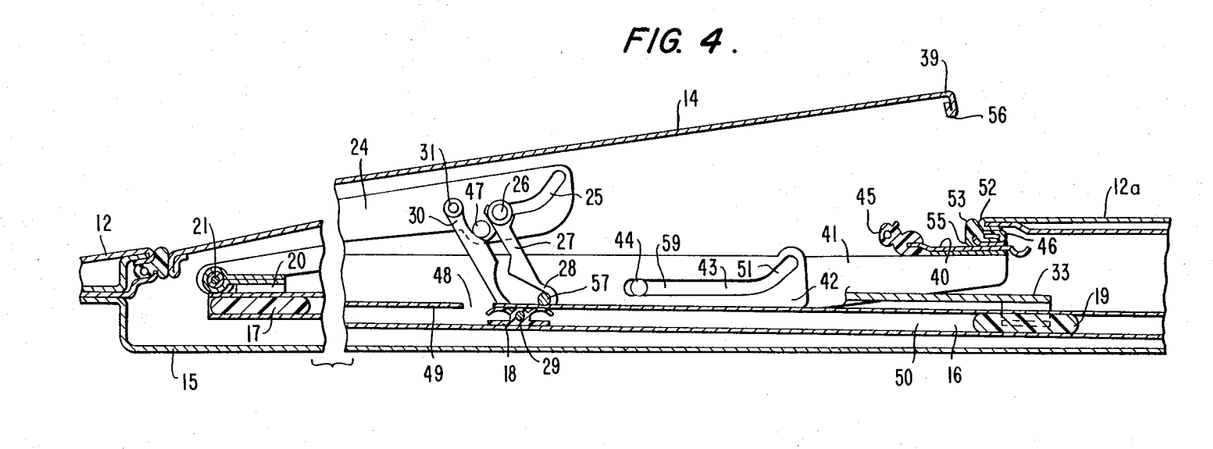
FIG. 4 is a cross section corresponding to FIG. 3, with the cover tilted.
Figure 5:
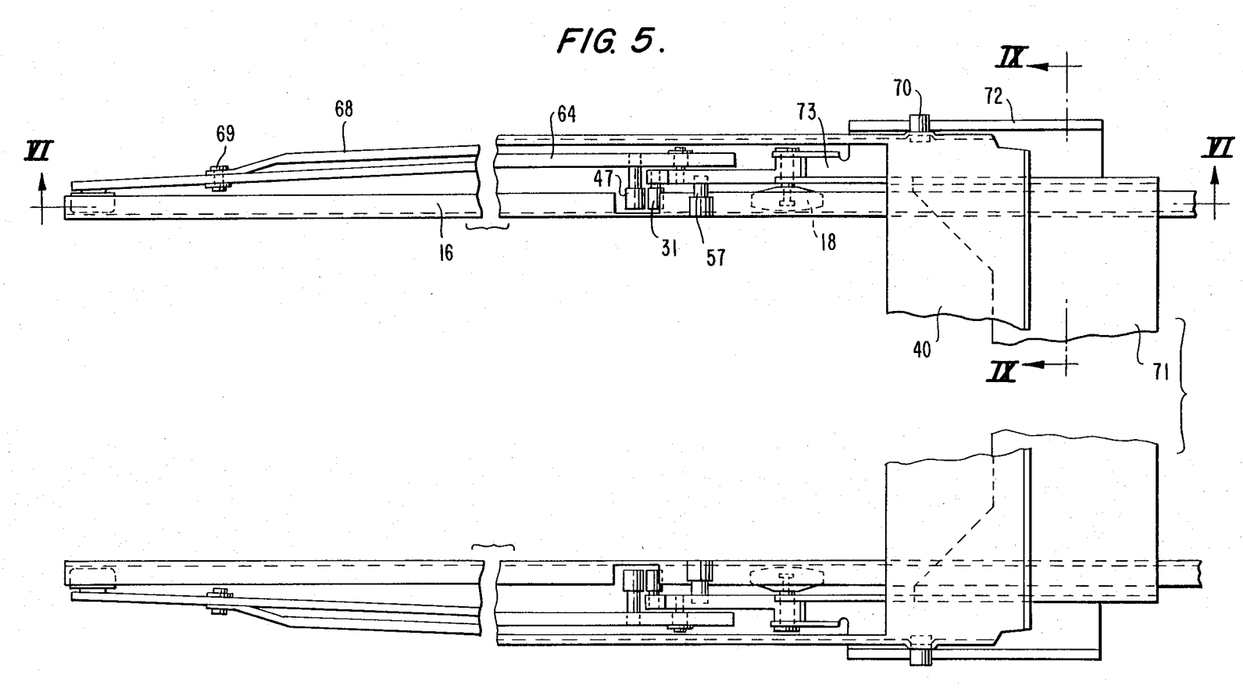
FIG. 5 is a top view similar to FIG. 1 for a modified embodiment of the invention.

When transport bridge 33 is moved further forward by threaded cable 34, starting in the position shown in FIG. 2, adjusting lever 28 is displaced forward relative to a pin 57 fastened to guide rail 16, whereby pin 57 comes to rest in a slot-like recess 58, while guide pin 26 moves toward the forward end of guide slot 25. The displacement force exerted on adjusting lever 28 via pivot pin 29 by transport bridge 33 causes adjusting lever 28 in FIG. 2 to pivot clockwise into the position shown in FIG. 4. Cover 14 is tilted. Conversely, displacing transport bridge 33 rearward causes cover 14 to return from the tilted position shown in FIG. 4 to the closed position shown in FIG. 2. In the closed position, cover 14 is under the influence of both pivot mechanisms, formed by slotted guides 24 and 42, and the corresponding guide pins 26 and 44. In this fashion, a reliable matching of the convexities between trailing edge 52 of rear fixed roof area 12a and cover trailing edge 39 is achieved due to the gutter being pressed against the underside of the cover and fixed roof area in the area of gaskets 45, 46 respectively.

In the case of the modified embodiment shown in FIGS. 5 to 8, slotted guide 64, which is fastened to cover 14, also forms the shoe carrier 65 for forward shoe 66. Shoe carrier 65 has a projection 67 that engages shoe 66 made of elastic material. This projection 67, together with shoe 66, forms the forward pivot bearing for cover 14 due to the compressibility of the elastic material from which shoe 66 is made. Gutter 40 is articulated to slotted guide 64 by respective lateral pivot arms 68 and pivot pins 69, each at a point which is displaced rearward and upward relative to the pivot axis of cover 14. Near its trailing edge, each pivot arm 68 has an outwardly projecting lifting pin 70. Said pin cooperates with a ramp 72 fastened on transport bridge 71. Corresponding to the first embodiment, middle shoe 18 is mounted on an arm 73 of transport bridge 71, while rear shoe 19 is connected to the rear portion of transport bridge 71. The mechanism provided to tilt cover 14 corresponds to that in the first embodiment. The same is true of the design of gutter 14 and gaskets 45 and 46 connected thereto.

Figure 6:
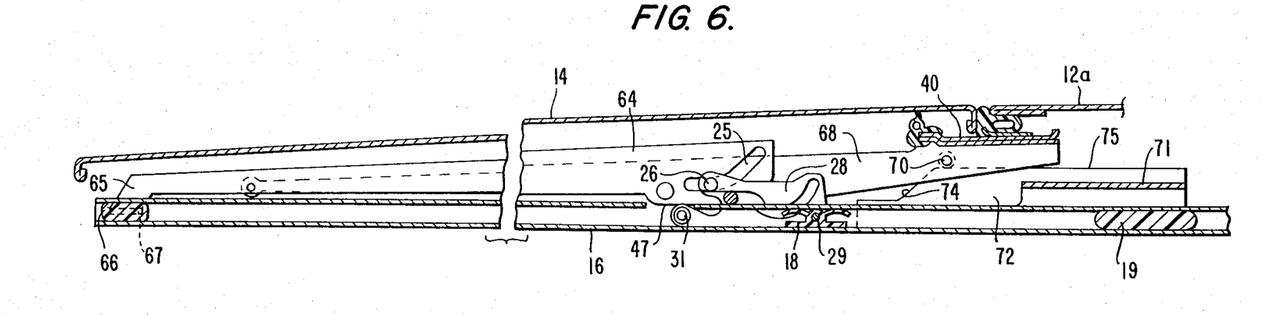
FIG. 6 is a section along line VI—VI in FIG. 5, with the cover in the closed position.
Figure 7:
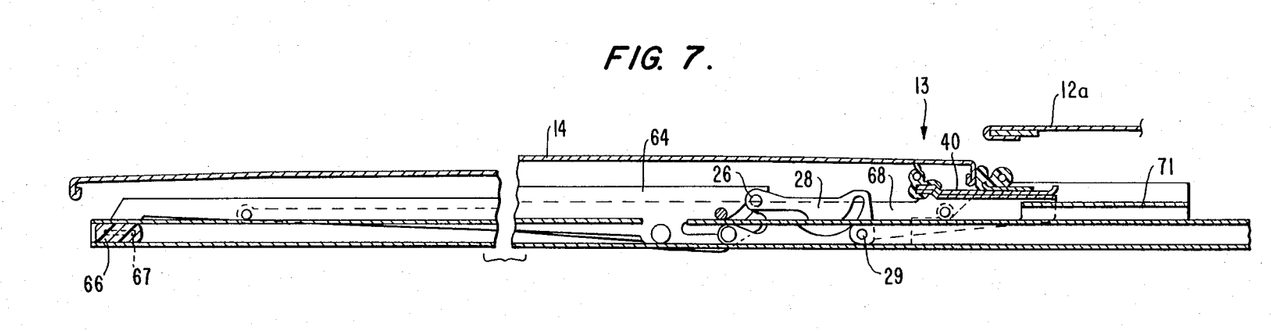
FIG. 7 is a section corresponding to FIG. 6, with the cover lowered at its trailing edge.

When transport bridge 71 is pulled backward, starting from the position shown in FIG. 6 in which the cover is closed, cover 14 is pivoted clockwise by guide pin 26 and slotted guide 24 about forward shoe 66 in FIG. 6. At the same time, lifting pin 70 on pivot arm 68 of gutter 40 moves downward along ramp 72. Gutter 40 is lowered, and can be pushed together with cover 14 beneath rear fixed roof area 12a.

When transport bridge 71 moves forward, cover 14 is brought into the closed position shown in FIG. 6 by slotted guide 24. The sloping part 74 of ramp 72 is pushed beneath lifting pin 70. Gutter 40 is pivoted upward about pivot pin 69. Gaskets 45 and 46 are pressed from below against cover 14 or rear fixed roof area 12a.

If transport bridge 71 is moved further forward, starting in the closed position shown in FIG. 6, the essentially horizontal edge 75 of ramp 72 is displaced beneath lifting pin 70. Gutter 40, therefore, assumes the position shown in FIG. 6. Cover 14 is pivoted into the position shown in FIG. 8 by means of adjusting lever 28.

Figure 8:
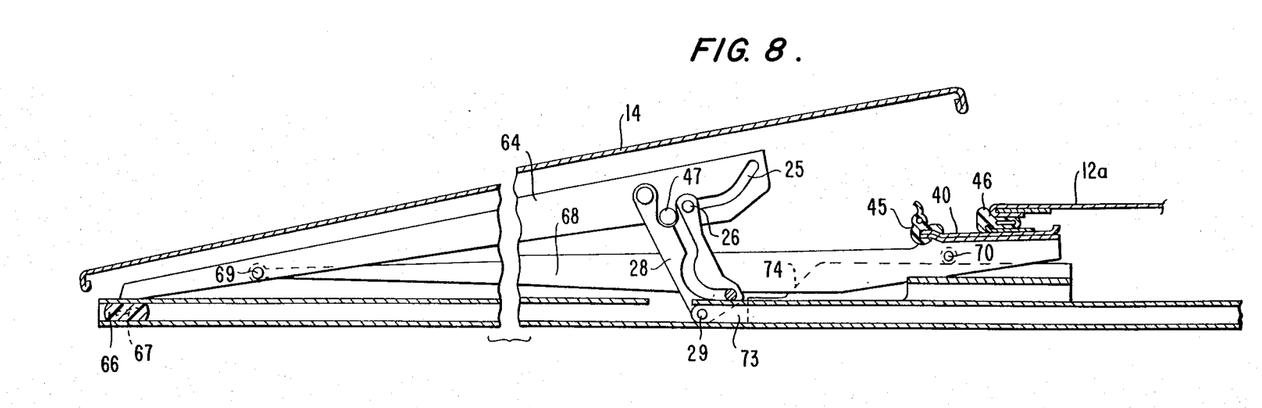
FIG. 8 is a section corresponding to FIGS. 6 and 7, but with the cover tilted.

Displacing transport bridge 71 rearward brings cover 14 out of the tilted position shown in FIG. 8 into the closed position shown in FIG. 6. In the closed position, in this embodiment as well, cover 14 is under the influence of the two pivot mechanisms formed by slotted guide 24 and guide pin 26, and by ramp 72 and lifting pin 70. Once again, a matching of convexities is achieved between rear fixed roof area 12a and cover 14 due to the gaskets 45, 46 of the gutter being pressed upwardly against the underside of the cover and fixed roof area, respectively.

Figure 9:
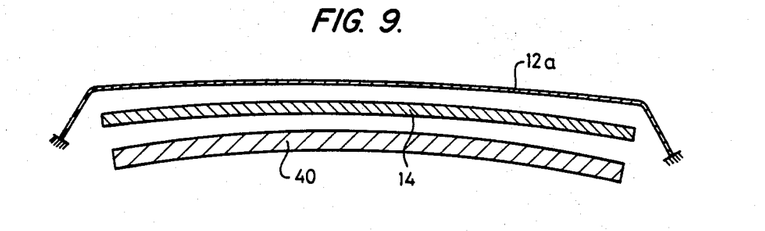
FIG. 9, schematically and considerably exaggerated with regard to the convexities, shows a section along line IX—IX in FIGS. 1 and 5, but for the case in which the gutter is out of mesh with the trailing edge of the cover and the trailing edge of the rear fixed roof area.
Figure 10:
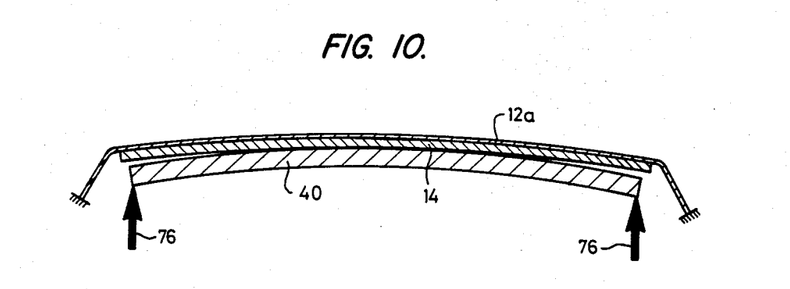
FIG. 10 is a view corresponding to FIG. 9 for a cover in the closed position and with the gutter partially moved upward as well.
Figure 11:
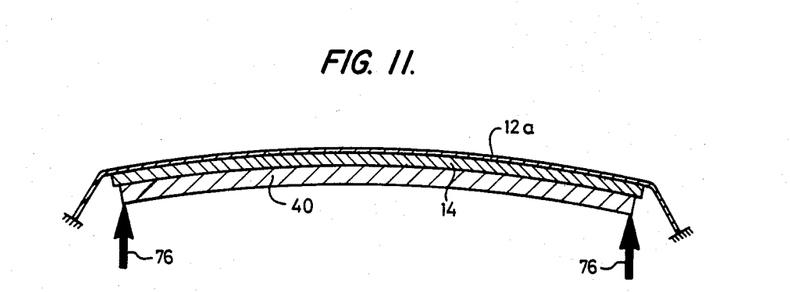
FIG. 11 shows a view similar to FIG. 10 after the gutter has reached its upper end position as shown in FIGS. 2 and 6.

This matching of contours is facilitated if the convexities of gutter 40, trailing edge 39 of cover 14, and rear fixed roof area 12a are adjusted to one another in a vertical plane, perpendicular to the cover displacement direction, such that the gutter is most convex, the cover trailing edge is slightly less convex by comparison thereto, and the rear fixed roof area 12a is least convex, as is shown in exaggerated form in FIG. 9. Optimum results are, therefore, achieved when the stiffness of gutter 40 is greater than that of cover 14 in the above-mentioned vertical plane, and cover 14, in turn, has a greater stiffness than the rear fixed roof area 12a. When gutter 40 is raised, the forces exerted by the second pivot mechanism, indicated in FIGS. 10 and 11 by arrows 76, confer a shape predetermined by the gutter on both the cover and the roof sheet metal (FIG. 11). In this regard, it should be appreciated that while, for the sake of simplicity in illustrating this feature schematically, FIGS. 10 and 11 show gutter 40 acting on fixed roof area 12a through the intermediary of cover 14, gutter 40 acts on the cover and fixed roof separately, as indicated above with regard to the specific embodiments.

It is understood that the embodiment shown and described in detail can be modified in a variety of ways. While guide slot 43 in branch 59, which guide pin 44 will pass through as it makes the transition from the closed position to the tilted position, is designed to be rectilinear and parallel to guide rail 16, so that gutter 40 is pressed against the underside of rear fixed roof area 12a over the entire area between the closed position and the tilted position, an appropriately modified design of guide slot 43 can ensure, for example, that the pressure of gutter 40 is exerted against the fixed roof area only when the cover is in the closed position. In other words, gutter 40 can be lowered to a greater or lesser degree in such a case when the cover is tilted.

While I have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Sliding and tilting roof for vehicles comprising a rigid cover which closes a roof opening in a closed position, said cover being displaceably guided in the vincinity of a leading edge of the cover via a guide element in a respective lengthwise guide at both of lengthwise sides of the roof opening, said guide elements defining a pivot axis for the cover running transversely to the cover displacement direction, said cover also being connected, by means of a first pivot mechanism, with a transport bridge that is displaceable in the cover displacement direction in an area located at a distance rearwardly of the leading edge of the cover, and said cover being selectively pivotable above a fixed roof area and displaceable beneath the rear of the fixed roof area by displacement of the transport bridge; and a rain gutter having limited mobility relative to the transport bridge in the cover displacement direction, said gutter being disposed beneath a trailing edge of the cover and being displaceable beneath the rear fixed roof area together with the cover, wherein the gutter is connected with the transport bridge by a second pivot mechanism, said second pivot mechanism being operable for pressing the gutter, counter to a force exerted by the first pivot mechanism, upward against the underside of the cover, so as to adjust the transverse contour of the cover when it is in the closed position.

2. Sliding and tilting roof according to claim 1, wherein said gutter is also operable for being pressed against the underside of the rear fixed roof area, when the cover is in the closed position, for matching the transverse contour thereof to the adjusted transverse contour of said cover.

3. Sliding and tilting roof according to claim 2, wherein said gutter is articulated by lateral pivot arms thereof to the guide elements of said cover and is pivotable about the same pivot axis as the cover.

4. Sliding and tilting roof according to claim 1, wherein said gutter is articulated by lateral pivot arms thereof to the guide elements of said cover and is pivotable about the same pivot axis as the cover.

5. Sliding and tilting roof according to claim 1, wherein said gutter is articulated to the cover by lateral pivot arms thereof at respective points that are displaced rearward relative to the pivot axis of the cover.

6. Sliding and tilting roof according to claim 2, wherein said gutter is articulated to the cover by lateral pivot arms thereof at respective points that are displaced rearward relative to the pivot axis of the cover.

7. Sliding and tilting roof according to claim 6, wherein the pivot axis of the gutter is also displaced upward relative to the pivot axis of the cover.

8. Sliding and tilting roof according to claim 5, wherein the pivot axis of the gutter is also displaced upward relative to the pivot axis of the cover.

9. Sliding and tilting roof according to claim 1, wherein the second pivot mechanism has slotted guides disposed on either side of the cover, a guide pin connected to the transport bridge cooperating with each of said slotted guides.

10. Sliding and tilting roof according to claim 2, wherein the second pivot mechanism has slotted guides disposed on either side of the cover, a guide pin connected to the transport bridge cooperating with each of said slotted guides.

11. Sliding and tilting roof according to claim 3, wherein the second pivot mechanism has slotted guides disposed on either side of the cover, a guide pin connected to the transport bridge cooperating with each of said slotted guides.

12. Sliding and tilting roof according to claim 8, wherein the second pivot mechanism has slotted guides disposed on either side of the cover, a guide pin connected to the transport bridge cooperating with each of said slotted guides.

13. Sliding and tilting roof according to claim 11, wherein the slotted guides are mounted on said lateral pivot arms.

14. Sliding and tilting roof according to claim 12, wherein the slotted guides are mounted on said lateral pivot arms.

15. Sliding and tilting roof according to claim 1, wherein the second pivot mechanism comprises ramps fastened to both sides of the transport bridge and guide elements mounted to the rain gutter and cooperating therewith.

16. Sliding and tilting roof according to claim 3, wherein the second pivot mechanism comprises ramps fastened to both sides of the transport bridge and guide elements mounted to the rain gutter and cooperating therewith.

17. Sliding and tilting roof according to claim 5, wherein the second pivot mechanism comprises ramps fastened to both sides of the transport bridge and guide elements mounted to the rain gutter and cooperating therewith.

18. Sliding and tilting roof according to claim 1, wherein the gutter supports a gasket extending essentially transversely to the cover displacement direction, said gasket abutting the underside of the cover when the latter is in a closed position.

19. Sliding and tilting roof according to claim 18, wherein, when the cover is in the closed position, said gasket abuts a point on the underside of the cover which is located at a distance forward of the trailing edge of the cover.

20. Sliding and tilting roof according to claim 2, wherein the gutter supports a gasket extending essentially transversely to the cover displacement direction, said gasket abutting the underside of the cover when the latter is in a closed position.

21. Sliding and tilting roof according to claim 20, wherein the gutter supports a second gasket extending essentially transversely to the cover displacement direction, said second gasket abutting the underside of the rear fixed roof area in the vicinity of a trailing edge of the roof opening, at least when the cover is in the closed position.

22. Sliding and tilting roof according to claim 21, wherein the second gasket comprises a segment which enters a gap between the trailing edge of the cover and the trailing edge of the roof opening, when the cover is in the closed position.

23. Sliding and tilting roof according to claim 21, wherein the second gasket has a shoulder which abuts the trailing edge of the cover at the rear, at least when the cover is in the closed position.

24. Sliding and tilting roof according to claim 2, wherein the cover and the rear fixed roof area are outwardly convexly curved in a vertical plane which is perpendicular to the cover displacement direction, and wherein, in a nonmutually pretensioned state, the gutter is also convexly curved in such a plane, the convexity in the vicinity of the trailing edge of the cover being less than the convexity of the gutter, and the convexity of the rear fixed roof area in the vicinity of a trailing edge of the roof opening, in turn, being less than said convexity in the vicinity of the trailing edge of the cover.

25. Sliding and tilting roof according to claim 24, wherein the stiffness of the gutter in the plane vertical to the cover displacement direction is greater than that of the cover, and the stiffness of the cover is, in turn, greater than that of said rear fixed roof area.

26. In a sliding and tilting roof of the type having a rigid cover which, in a closed position, closes a roof opening, the cover being slidably displaceable from said closed position on guide elements that are pivotally connected thereto and displaceably received in lengthwise guides on opposite lengthwise sides of the roof opening, and being tiltably raisable relative to a fixed roof area about a pivot axis defined by said guide elements, and having a gutter for collecting water entering through said roof opening between the cover and fixed roof area, the improvement for conforming the outside contour of the cover, in a direction transverse to the displacement direction of said cover, to the corresponding contour of the fixed roof area, when said cover is in said closed position, comprising means for producing relative movement between the cover and the gutter in a manner causing an interengagement between the gutter and the underside of the cover that adjusts the transverse contour of said cover.

* * * * *